United States Patent [19]

Langton

[11] 4,422,289

[45] Dec. 27, 1983

[54] FUEL CONTROL APPARATUS FOR A GAS TURBINE ENGINE

[75] Inventor: Roy Langton, Simsburry, Conn.

[73] Assignee: Aviation Electric Ltd., Montreal, Canada

[21] Appl. No.: 262,868

[22] Filed: May 12, 1981

[51] Int. Cl.³ .............................................. F02C 9/28
[52] U.S. Cl. .................................................. 60/39.281
[58] Field of Search ................................... 60/39.28 R

[56] References Cited

U.S. PATENT DOCUMENTS

| | | |
|---|---|---|
| 3,006,144 | 10/1961 | Arnett et al. . |
| 3,152,444 | 10/1964 | Peczkowski et al. . |
| 3,320,741 | 5/1967 | Glista ............................. 60/39.28 R |
| 3,393,691 | 7/1968 | Longstreet et al. . |
| 3,587,229 | 6/1971 | Peczkowski . |
| 3,664,124 | 5/1972 | Fehler ............................. 60/39.28 R |
| 3,672,163 | 6/1972 | White ............................. 60/39.28 R |
| 3,820,321 | 6/1974 | Burrage ........................ 60/39.28 R |
| 3,832,846 | 9/1974 | Leeson . |
| 3,888,078 | 6/1975 | Greune et al. . |
| 4,018,044 | 4/1977 | Joby et al. . |
| 4,033,112 | 7/1977 | Schuster ........................ 60/39.28 R |
| 4,040,250 | 8/1977 | Saunders et al. . |
| 4,045,955 | 9/1977 | Brannstrom et al. . |
| 4,100,731 | 7/1978 | Janes et al. . |
| 4,134,257 | 1/1979 | Riple . |
| 4,171,613 | 10/1979 | Schmidt-Roedenbeck et al. . |
| 4,188,781 | 2/1980 | Johnson et al. . |

FOREIGN PATENT DOCUMENTS 54501  12/1981  European Pat. Off. .

OTHER PUBLICATIONS

"SD Series" Controls for Aero-Engines–D. A. Caine–Nov. 1975 Digital Control for Helicopter Powerplants–D. A. Caine & S. Janik–Nov. 1979 NDEC–A Control Concept for Helicopter Gas Turbines–D. J. Hawes & R. M. Evans–May 1980.

Primary Examiner—Louis J. Casaregola
Attorney, Agent, or Firm—William A. Marvin; Anthony F. Cuoco

[57] ABSTRACT

A fuel control apparatus (34) for a gas turbine engine (10). The fuel control apparatus (34) meters fuel flow Wf according to an electrical signal (Wf/Pc, E) indicative of the desired fuel/air ratio of the engine as scheduled from the power lever angle (PLA) by a closed loop acceleration based electronic governor (26). The apparatus (34) mechanically multiplies the electrical signal (Wf/Pc, E) by the compressor discharge pressure (Pc) of the engine (10) to yield the fuel flow (Wf).

14 Claims, 13 Drawing Figures

FUEL CONTROL APPARATUS FOR A GAS TURBINE ENGINE The invention pertains generally to a fuel control apparatus for a gas turbine engine and is more particularly directed to such fuel control apparatus regulated by an electronic governor which acts to directly control the fuel/air ratio of the engine.

The closed loop fuel control of gas turbine engines based on acceleration has become successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. The acceleration term, which after integration effectively provides a datum for a proportional speed control loop, may therefore, be a function of any of a number of control input parameters including engine speed, ambient pressure, temperature, compressor pressure, etc. Advantages of this form of acceleration control include consistent predictable accelerations independent of fuel type, temperature, and altitude. The acceleration time is also generally independent of air bleed and power extraction status.

A closed loop fuel control for a gas turbine engine based on acceleration is more fully disclosed in U.S. application Ser. No. 210,938, filed Nov. 28, 1980, by Rowland M. Evans, which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

To regulate the fuel flow to the engine, the system illustrated in the Evans application provides an electrical signal from an electronic governor which is a function of the desired fuel/air ratio Wf/Pc of the engine. The signal is received by a fuel control apparatus that mechanically multiplies the demanded fuel/air ratio by the compressor discharge pressure, Pc, to generate the needed fuel flow Wf.

By scheduling a fuel/air ratio, rather than a fuel flow, the open loop schedule that the electronic governor stores can be simplified. Further, the electrical transduction of pressure over the entire flight envelope of the engine is unnecessary since the only term needed to be transduced is acceleration. Thus, the scheduling of the fuel/air ratio eliminates the expensive and complex electronic pressure transducer systems heretofore necessary to develop an accurate control of the engine.

There are a number of fuel control apparatus known in the art that provide the scheduling of a fuel/air ratio to the engine based upon a multiplication of the input fuel flow demand signal by the compressor discharge pressure. A pneumatic fuel control of this type is illustrated in U.S. Pat. No. 3,500,638 issued to R. W. Schuster on Mar. 17, 1970, and U.S. Pat. No. 3,587,229 issued to J. L. Peczkowski on June 28, 1971. While highly advantageous in use these controls illustrate no method for developing an interface with an electronic governor for full authority electronic control. Moreover, these controls utilize a pneumatic bellows arrangement that communicates directly to compressor discharge pressure. A differential pressure is formed as a function of the discharge pressure and one of the pressures of the differential is modulated to control a fuel valve position directly from the movement of the bellows. Because the bellows arrangement communicates directly to the compressor discharge pressure it is subject to contamination. Additionally, these systems are somewhat prone to oscillatory movements because of the response of the bellows.

U.S. Pat. No. 4,033,112 issued to R. W. Schuster, describes a fuel control system for a gas turbine engine in which the compressor discharge pressure is measured and transduced into an electrical signal for transmission to an electronic control unit. The electronic control unit provides a trim to a hydromechanical unit scheduling the fuel/air ratio by means of a proportional solenoid controlling the area of an orifice.

In two related U.S. patent application Ser. Nos. 137,659; and 193,229 a backup metering system is described for the fuel control system disclosed in the Schuster reference U.S. Pat. No. 4,033,112. These backup controls regulate the activity of the fuel control system when an electronic failure takes place and the operator must shift from automatic governing to manual control. These backup systems are fairly complex and utilize a transfer valve for switching the scheduling of fuel from a primary metering valve to a backup metering valve when a problem is sensed. In application Ser. No. 137,659, the demanded fuel signal input to the manually operated backup valve is modified by a compressor pressure signal to provide a scheduling of fuel flow according to the fuel/air ratio needs of the engine. The advantages of a manual backup control scheduling fuel/air ratio instead of fuel flow are well known to those skilled in the art.

SUMMARY OF THE INVENTION

The invention is a fuel control apparatus for a gas turbine engine controlled by an electronic governor means which schedules an electrical signal indicative of a demanded fuel/air ratio comprising, means for modulating a hydraulic control pressure according to the electrical signal, means for generating the hydraulic control pressure proportional to the discharge pressure of the compressor of the engine, and a metering valve, whose position is proportional to the fuel flow therethrough, and whose position is controlled by the hydraulic pressure.

In a preferred embodiment the means for generating a hydraulic pressure proportional to the compressor discharge pressure is a copying valve which is positioned with respect to a reference pressure and the compressor discharge pressure. The copying valve includes a first bellows attached to a spool valve whose inner chamber is vented to a pressure source modulated by the spool valve position, and whose outer chamber is communicated to the compressor discharge pressure. The opposite end of the spool valve is referenced to a predetermined pressure by a second bellows arrangement. The differential pressure between the inner and outer chambers of the second bellows controls the positioning of the spool valve to where they are in equilibrium. The inner chamber pressure is then a hydraulic control pressure generated proportional to the pneumatic compressor discharge pressure.

The advantage of the copying valve is that the positioning of the metering valve is accomplished by a hydraulic rather than a pneumatic pressure. This prevents contamination of predetermined control orifice areas and further allows a force applification for regulating the positioning of the metering valve. Because of the increased force available, the mechanical response of the metering valve can be tailored where it is non-oscillatory.

The hydraulic control pressure is modulated by a bleed or orifice whose area is controlled by an electrical control in the form of a proportional solenoid. The proportional solenoid has a travel which is linear to the current of the electrical signal input from the electronic governor means. A multiplication of the electrical signal indicative of fuel/air ratio, Wf/Pc, by the hydraulic signal indicative of compressore pressure Pc occurs as a result of the modulation. In this manner the electrical input signal is transduced into a hydraulic control pressure indicative of the desired fuel flow. This hydraulic control pressure positions a proportional metering valve to cause the fuel flow Wf.

The metering valve includes a spool valve and a control chamber which communicates to the hydraulic control pressure. One end of the spool valve is resiliently balanced in the control chamber to produce an initial positioning of the valve. The control pressure then varies this positioning as a function of the combination of the electrical input signal and the hydraulic pressure produced by the copying valve. The metering valve has a position proportional to the fuel flow therethrough by being provided with a pressure regulation means that produces a constant pressure drop between an upstream pressurized source of fuel and the downstream output of the valve.

The advantages of this type of fuel control are that a fuel/air ratio is scheduled according to an electrical signal in a facile manner. This allows a solenoid with a liner travel to be used for controlling the area of the modulating orifice over the entire flight envelope of the gas turbine engine. Thus, the accuracy of the electrical control signal is the same over all altitude ranges. This permits a more responsive engine and accurate control for accelerations, decelerations, and steady state speeds.

According to another feature of the invention the fuel control apparatus has means for providing a maximum fuel/air ratio and a minimum fuel/air ratio. This feature advantageously provides a fuel control system that fails to a maximum fuel/air ratio instead of a maximum fuel flow if the electronic governor becomes inoperative. Thus, an electronic failure prior to a switchover to manual control will not cause a surge as readily as if normal limiting action had been employed.

Moreover, the fuel control apparatus includes a backup arrangement where a power failure of the electrical control transfers the modulated orifice to a manual schedule automatically. In a preferred form, the backup arrangement includes a modulating means having two scheduling means. Normally, the first scheduling means under the influence of a linear solenoid schedules the fuel flow by modulating the orifice area according to the electrical signal input from the electronic governor. This scheduling means is in control of the orifice area when the solenoid is beyond a predetermined point in its linear travel. When, however, the solenoid fails to its initial position the modulating means transfers to the second scheduling means. The second scheduling means operates in a range between the initial solenoid position and the predetermined position of the solenoid. Thus, when the solenoid fails it will not affect movement of the second scheduling means. A cam mechanism connected to a manually operated power lever controls the positioning of the second scheduling means to modulate the orifice opening when electrical failure occurs.

In this manner a convenient backup mechanism is provided which eliminates the need for complicated transfer valves and mechanisms. Moreover, the mechanism uses the same principle metering valve that the electronic control uses and thus schedules a fuel/air ratio which can be controlled more easily by manual operation. Further, the switchover to manual operation is automatic when the electrcial control fails.

These and other objects, features, and aspects of the invention will be better understood and more clearly explained if a reading of the detailed disclosure is undertaken in conjunction with the appended drawings wherein:

DETAILED DESCRIPTION OF THE PREFERRED EMBODIMENTS

Figure 1:
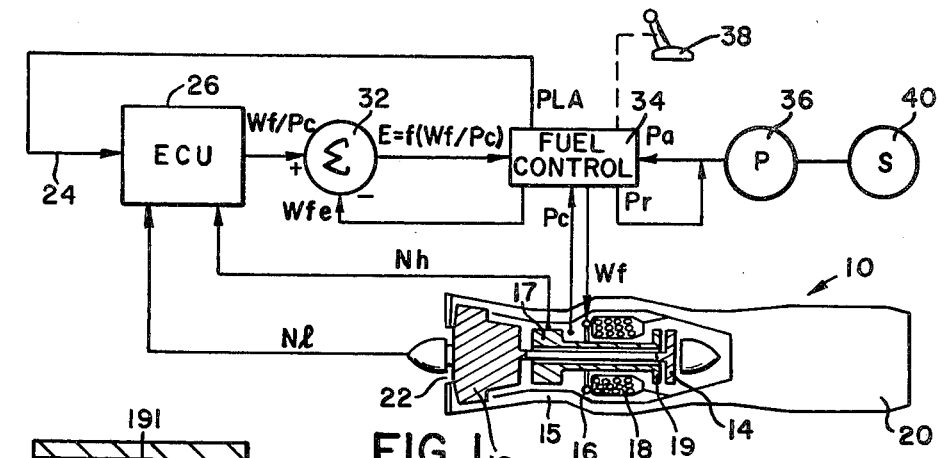
FIG. 1 is a system block diagrammatic view of a fuel control system for a gas turbine engine including a fuel control apparatus which is constructed in accordance with the invention.

With reference initially to FIG. 1 there is shown a fuel control system for a gas turbine engine which is generally designated 10. The engine 10 includes an intake duct 22 through which air enters. After entering the engine, the air is compressed by a low pressure (LP) compressor 12 and subsequently by high pressure (HP) compressor 17. Compressors 12 and 17 are of the axial or centrifugal type which produce an increase in pressure and consequently, an increases in density of the incoming air proportional to their rotational speed. The denser air moves to a fuel supply section where a fuel ring 16 produces a combustible fuel/air mixture by spraying fuel into the incoming air stream. The fuel/air mixture is thereafter ignited and combusted in burners 18 to produce a high velocity exhaust gas. The exhaust gas, as is conventional in this type of reaction engine exits through a nozzle 20 to produce a forware thrust. A portion of the energy contained in the exhaust gases is expended in rotating a low pressure turbine 14 and a high pressure turbine 19 which are physically attached to the respective compressors by concentrically disposed rotor shafts. Each compressor and turbine combination form a spool which rotates independently from the other. Additionally, after passage through the LP compressor, or part of it, a portion of the incoming air can be channelled into a shroud 15 which bypasses the engine and combines with the exhausted gases upstream of the nozzle. The engine described is a conventional two-spool turbo-fan engine in which the second or low pressure spool has been added to increase the efficiency of the engine.

Generally, the control of the engine speed and thus the output power or thrust of the engine, is regulated by the amount of fuel flowing into the fuel ring 16. This fuel flow Wf is modulated by the fuel control system to provide more or less energy to the exhaust gas and thus reaction power from the engine. Generally, increasing the fuel flow increases the engine speed and output power while decreasing the fuel flow decreases the engine speed and output power.

The fuel control system is provided for assuring that the control of the engine speed is maintained during steady state operation, accelerations, and decelerations. The fuel control system illustrated comprises basically an electronic governor means 26 and a fuel control apparatus 34. The fuel control apparatus 34 meters fuel to the engine 10 under the control of an electrical signal Wf/Pc indicative of a demanded fuel/air ratio. Preferably, the electronic governor 26 generates the electrical signal Wf/Pc as a function of at least one operating parameter of the engine related to output power. In the present illustration the governor 26 receives, by input signal line 24, the position of the power lever angle PLA from the power lever 38, the speed of the HP compressor Nh, and the speed of the LP compressor Nl. The governor schedules accelerations based on the operator input through the signal PLA and uses the actual parameters Nh or Nl for feedback to close the loop. Advantageously, the governor 26 can be the acceleration based closed loop control disclosed in the referenced Evans application.

The electrical control signal or demanded fuel/air ratio Wf/Pc is input to a summing junction 32 which has as another input an electrical signal Wfe. The electrical signal Wfe is a feedback term developed from the position of a metering valve and is descriptive of the amount of actual fuel flowing to the engine. The difference of these two terms (Wf/Pc−Wfe) is an error signal E that controls the metering of the fuel as a function of the fuel/air ratio. The error signal E has a droop value in the steady state that is the demanded fuel/air ratio. The fuel control apparatus 34 can be controlled directly by the electrical control signal Wf/Pc but the additional loop closure by the feedback term Wfe provides a more accurate and responsive control.

The fuel control apparatus 34 receives a pressurized fuel supply from the output of a pump 36 drawing fuel from a source 40. The incoming fuel is at a pressure Pa and a portion is recirculated at a pressure Pr to the pump outlet. The pressurized fuel is metered by a fuel metering valve included in the fuel control unit 34 under the control of the electrical signal E or Wf/Pc after being mechanically multiplied by the compressor discharge pressure Pc to form the output fuel flow Wf to the burner ring 16. In this manner the fuel/air ratio and thus the output power of the engine is scheduled according to the output signal Wf/Pc from the electronic governor means 26.

The electrical signal PLA is transduced from the mechanical position of the power lever 38 shown as a dotted input to the fuel control apparatus. The power lever 38 is under control of the operator of the device that the engine is powering. The movement of the power lever 38 will further be used to provide an indication of the operator desired fuel/air ratio during a manual control mode of the fuel control apparatus as will be more fully explained hereinafter.

Figure 2:
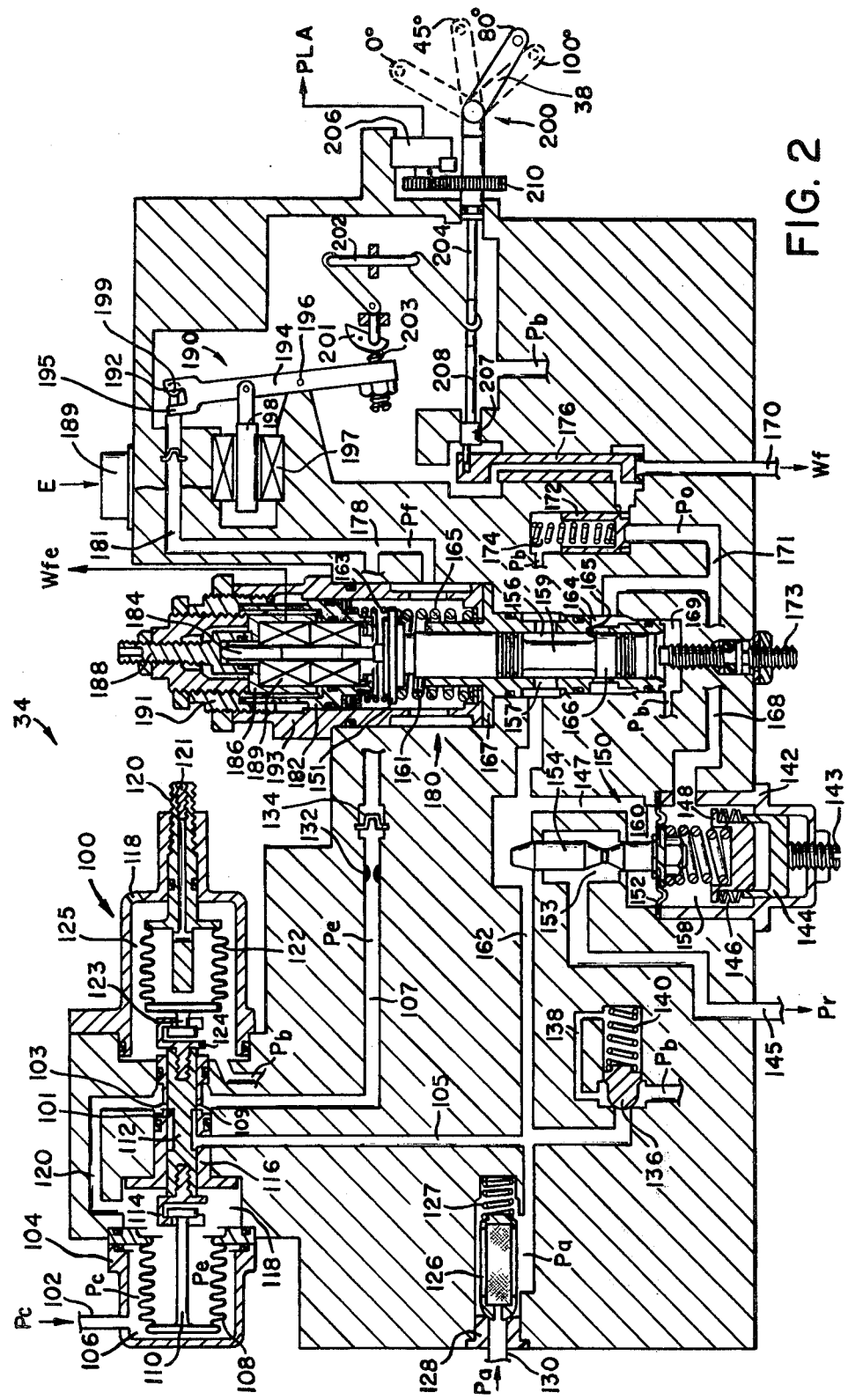
FIG. 2 is a detailed cross sectional side view of the fuel control apparatus illustrated in FIG. 1.

The fuel control apparatus 34 is shown in more detail in FIG. 2 where an inlet 130 delivers fuel through plug 128 and a filter 126 at pressure Pa to a supply conduit 162. The inlet 130 is connected to and supplied by the pump 36. The filter 126 is generally annular shaped and loaded by a spring 127 against the plug 128. Overpressure from the pump is vented to body pressure Pb by means of a relief valve 136 normally closed by a spring 140 and having a feedback channel 138. The pressurized fuel supplied through conduit 162 is metered by a primary metering valve generally designated 180 to generate an output fuel flow, Wf, via output conduit 170. The output conduit 170 is connected by suitable means to the burner ring 16 of the engine 10.

The output conduit 170 communicates fluidically with the primary metering valve 180 through a pressuring valve 172, a cutoff valve 176, and a connecting conduit 171. The primary metering valve 180 regulates the amount of opening of a set of metering orifices 164 between the conduit 162 and conduit 171 to control the amount of fuel delivered to the engine 10 as will be more fully explained hereinafter.

The pressuring valve 172, normally closed by spring 174, provides a means for building up a minimum fuel pressure in the metering valve circuit prior to delivery to the burner ring 16. Once the initial minimum pressure is reached, the valve 172 retracts against the body pressure Pb to permit communication between conduits 171, 173. Cutoff valve 176, shown in a closed position, vents fuel from conduit 171 to the body pressure Pb when the power lever 38 is in a cutoff position. When the power lever 38 is rotated to say, an idle position, the eccentric 207 is rotated by linkage 204, 208. An offset pin in the eccentric 207 fits into a slot of the cutoff valve to move the valve when the eccentric is rotated. The movement of the valve seals the fluid path to body pressure Pb and connects conduit 171 to conduit 170. Rotation of the power lever 38 further causes gears 210 to position a rotary motion transducer 206 generating the signal PLA.

The output fuel flow Wf from conduit 170 is at a pressure Po lower than Pa and the difference, Pa−Po, is maintained constant by means of a regulator generally designated 150. The difference is kept constant so that the amount of fuel flow through the valve is a function of the metering valve position and orifice opening only. The regulator comprises a tapered valve 154 positioned by means of a diaphragm 152 affixed thereto. The diaphragm moves in response to the pressure differential between chambers 160 and 158. Chamber 160 communicates to the pressure Pa upstream of the metering valve 180 via conduit 169, and chamber 158 communicates to the pressure Po downstream of metering valve 180 via conduit 168. Differences in pressure between the two chambers 158 and 160 causes the valve 154 to move and allow variable fulid communication between chamber 153 and the upstream and downstream pressures. This action will maintain the differential Pa−Po at substantially constant value throughout perturbations in the pump pressure and fuel flow variations.

The bypassed fuel in chamber 153 is returned by output conduit 145 at pressure Pr to the output of the pump to be recirculated. The initial adjustment of the differential pressure is provided by an adjustment screw 143 increasing or decreasing an initial spring load on diaphragm 52 by means of interseated cups 142 and 144. The cups apply the load through spring 148. A temperature adjustment is provided for the pressure differential by a bimetallic spring element 146 which adjusts the spacing between the interseated cups 148 and 144.

In this manner the pressure differential Pa−Po across the primary metering valve 180 is maintained substantially constant for changes in pressure, pump output, fuel flow through meter valve 180, and temperature. These corrections are to provide a fuel flow Wf which is substantially only a function of the metering valve position.

The primary metering valve 180 varies the fuel flow from conduit 162 to 171 by positioning a spool valve 166 within a sleeve member 167. The sleeve 167 has an inner bore which forms an annular chamber 156 with the link 159 of spool valve 166. Chamber 156 has fuel communicated to it under pressure Pa by apertures 157 cut in the sleeve 167. Fuel is metered from the chamber 156 by a metering edge 165 being positioned with respect to a set of metering orifices 164 further machined in the sleeve 167.

The spool valve 167 is initially positioned with respect to the apertures 164 by means of biasing springs 163 and 165. The biasing springs 163 and 165 located on either side of a flange 151 produce a small opening for an initial fuel flow through apertures 164. The springs are contained within a control chamber 161 communicating with a control pressure Pf via conduit 178. The initial tensioning of the biasing springs 163, 165 are provided by an adjustable casing member 191 which screws into a fixture 193.

The extent of travel of the fuel valve 166 is limited by a maximum fuel stop 173 and a minimum fuel stop 188 which are adjustable. The minimum fuel stop 188 limits the upward positioning of an armature 184 constructed of at least partially permeable material which is attached to the sleeve valve 166. A linearly variable differential transformer LVDT 189 senses the movements of the armature 184 and generates the electrical signal Wfe indicating the positioning of the valve and hence the actual fuel flow therethrough. The LVDT 189 mounts within a central bore of the fixture 193 and is positioned initially by a movable cup 186 and coupler 185 which telescope into the casing member 191.

A control pressure Pf applied at one end of the spool valve 166 in chamber 161 is balanced by the return force of the body pressure Pb at the other end of the valve via chamber 169 and the forces of the biasing springs. Increases in the pressure Pf cause the valve to travel downward, as viewed in the drawing, and supply more fuel to conduit 171, and decreases in pressure Pf cause a decrease in fuel flow. Thus, the fuel metered to conduit 171 is a function of the position of the valve 166 and consequently, the control pressure Pf.

The control pressure Pf generated in conduit 178 for communication to control chamber 161 is developed by a hydraulic pressure Pe passing through a restriction 132 of predetermined area Ae. The hydraulic pressure Pe is developed as a function of the compressor discharge pressure Pc by a copying valve generally designated 100. The copying valve 100 receives fuel at pressure Pa through conduit 105 and via a spool valve 112 converts it into a hydraulic control pressure Pe for output to conduit 107.

The spool valve 112 slides in a sleeve fixture 116 mounted in the body of the fuel control apparatus 34. The ends of the spool valve 112 have slotted connectors 114, 124 attached thereto by studs that screw into threaded portions of the valve. The connectors are U shaped in cross section and receive the flange ends of pedestal-shaped members 110 and 123, respectively. Pedestal member 110 is connected by its other flange to a bellows 108. The other side of the bellows is attached to the body of the fuel control apparatus 34. A casing 104 surrounds the bellows 108 and forms a chamber 106 which communicates with the compressor discharge pressure Pc via an inlet 102. An inner chamber 118 formed in the body by the bellows 108 communicates via a conduit 120 and valve 112 to the input pressure Pa.

The pedestal 123 is attached to one end of a second bellows 122 which has a T-shaped holder 120 fixed at its other end. The holder 120 includes a central bore that can be used to evacuate the bellows 122 below atmospheric pressure. The vacuum is thereafter sealed in the bellows by a plug 121 inserted in the bore. Surrounding the bellows 122 and forming a chamber 125 is another cup-shaped casing member 118. The casing member has a boss in which the holder member 120 mounts. The chamber 125 is referenced to the body pressure Pb.

In operation, the copying valve serves to copy the pneumatic compressor discharge pressure Pc into the hydraulic control pressure Pe. This is accomplished by changes in the compressor discharge pressure Pc balancing the hydraulic pressure in chamber 118 until an equilibrium condition exists. The equilibrium condition is established by the spool valve 112 moving and varying the orifice opening 103 with metering edge 101. Since orifice 108 is the same size as orifice 103 and its area controlled by the metering edge 101, the pressure in conduit 107 is also Pe.

Preferably, Pe is proportional to the compressor discharge Pc minus the body pressure Pb. The Pb term is subtracted from Pc by the influence of the evacuated bellows 122 acting in a direction to assist the pressure Pe. Since the primary metering valve 180 is additionally referenced to body pressure Pb, the subtraction of Pb from Pc provides for a cancellation of this term from the positioning of the metering valve. Thus, the hydraulic pressure Pe in conduit 107 is a copy of the pneumatic pressure Pc.

The hydraulic control pressure Pe, after passing through the fixed orifice 132, is modulated by an interface assembly generally designated 190 to become the control pressure Pf. The interface comprises a modulating means or lever 194 rotatable about a pivot 196, a manual control, and an electrical control.

Movements of the electrical control and the manual control cause the lever to pivot about its axis to position a bifurcated end which has two flat plate valves 192 and 195, respectively. Each flat plate valve moves across an orifice 199 which communicates with conduit 178 and the hydraulic control pressure Pf. The varying area of orifice 199 lowers or raises the pressure Pf to position the spool valve 166. The bifurcated end of the lever 194 essentially sets up two fueling schedules, one caused by the valve 192 moving across the orifice 199 and the other caused by the valve 195 moving across the orifice 199. The electrical control positions valve 195 and the manual control positions valve 192.

The electrical control includes a solenoid 197 with an armature 198 attached to the lever 194. The armature 194 is positioned as a function of the currrent applied to its coil from a connector 189. The connector receives the electrical control signal E or Wf/Pc from the summing junction 32 to position the armature.

Figure 6:
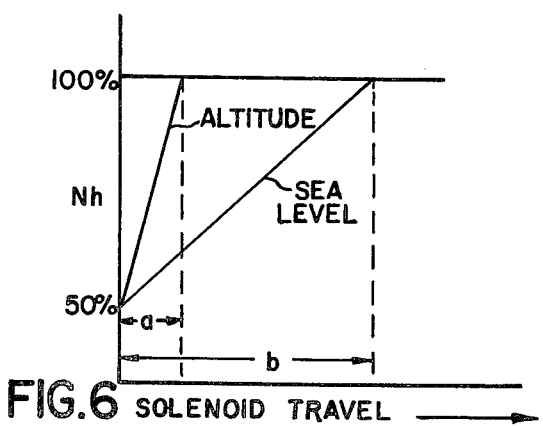
FIG. 6 is a graphical representation of the speed of a gas turbine engine as a function of solenoid travel for a conventional fuel control.

Preferably, the solenoid travel as a function of fuel/air ratio is a linear straight line function although it could be more complex. Because the solenoid travel is a function of fuel/air ratio instead of fuel flow, the solenoid movement maintains a constant accuracy over the flight envelope of the engine. FIG. 6 illustrates a schedule of solenoid travel as a function of fuel flow or engine speed for conventional fuel control. A linear schedule can be formed but must be changed as the engine changes altitude. This will create a range of solenoid travel of distance a at altitude and a range of solenoid travel of distance b at sea level. This produces an accuracy mismatch. If the solenoid movement is only within the accuracy requirements for range b, then it will not be accurate enough for the shorter range a. However, if the solenoid movement is within the accuracy requirements for range a, it will be more accurate and expensive than necessary for range b. Thus, when a variable solenoid schedule is used accuracy and cost must be balanced. With the present system, a constant schedule for solenoid travel can be used because the mechanical multiplication of the input signal by Pc provides the altitude correction automatically.

Figure 3A:
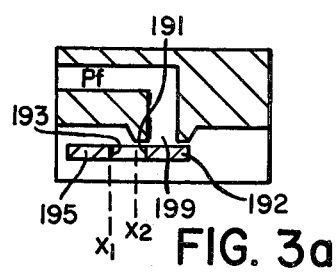
FIGS. 3a–d are partial fragmentary top views in cross section of a means for modulating a control orifice of the fuel control apparatus illustrated in FIG. 2.
Figure 3B:
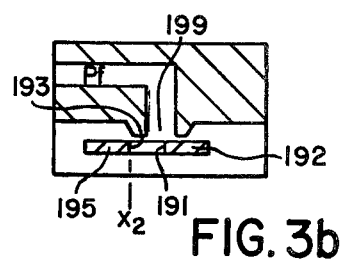
Figure 3C:
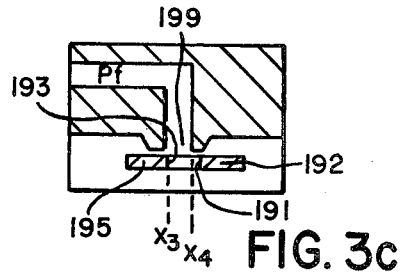
Figure 3D:
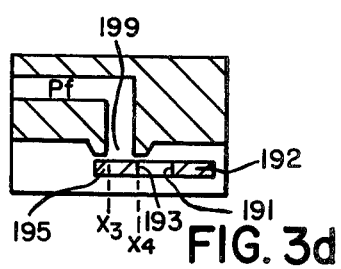
Figure 4:
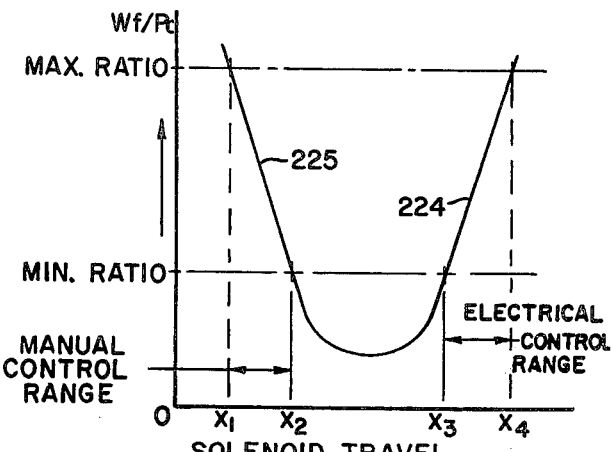
FIG. 4 is a graphical representation of fuel/air ratio as a function of the position of the orifice modulating means for the fuel control apparatus illustrated in FIG. 2.

In FIGS. 3c, 3d, and 4 it is seen that the solenoid 197 controls the area of orifice 199 by the flat plate valve 195. FIGS. 3c, and 3d illustrate the movements of the valve 195 controlling the area of orifice 199 by positioning of metering edge 193 and FIG. 4 illustrates the electrical control range with respect to the solenoid travel. The electrical control range is from a predetermined solenoid position X3 to a predetermined or fully extended solenoid position X4. X3 initially positions edge 193 to yield the minimum fuel/air ratio desired. It can be seen that as the valve 195 moves to the right, as pictured in FIG. 3c, less area of the control orifice 199 is open. At X3 the minimum fuel ratio is generated because the greatest area of orifice 199 will be open and the hydraulic control pressure in chamber 161 the smallest. As more area of the control orifice is closed, the pressure will rise according to the schedule shown in FIG. 4 along line 224 to position the valve 166 and allow more fuel flow to the engine. The maximum fuel/air ratio is at X4 when the entire orifice 199 is closed.

When current to the solenoid 197 is interrupted the solenoid will move to an initial position at the origin O shown in FIG. 4. This removes the influence of the solenoid and allows failure of the fuel/air ratio control to the manual control. The solenoid positioning at O brings the flat plate valve 192 into contact with the orifice 199 and the other end of the lever 194 into contact with a cam 201. The cam 201 is connected through linkage 202 to a rod 204 rotated by the power lever assembly 200 under control of an operator. The power lever when it is rotated will schedule the fuel/air ratio of the engine along line 225 as the flat valve 192 modulates the open area of the orifice 199.

Figure 5:
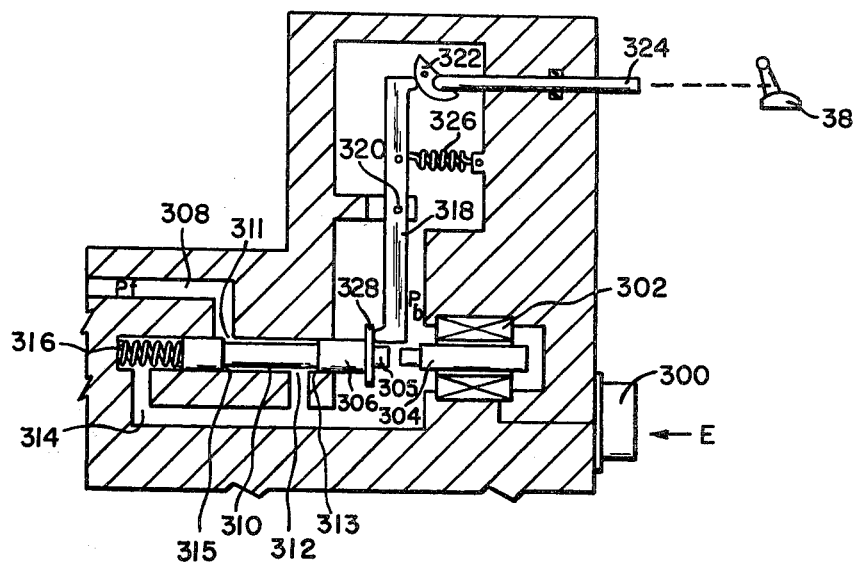
FIG. 5 is a partial fragmentary view in cross section of a second embodiment of a backup arrangement for the fuel control apparatus illustrated in FIG. 2.

With respect now to FIG. 5, there is illustrated another embodiment of the backup arrangement. The lever with the dual schedule has been replaced by a spool valve 306 with the capability for scheduling manual and electrical fuel/air ratios. The valve 306 is loaded by spring 316 in a bore of the fuel control apparatus 36. Resisting the force applied by the spring 316 and positioning the valve is a manual control and an electrical control. The spool valve 306 receives the hydraulic control pressure Pf via conduit 308 and modulates the control pressure by varying the area of orifices 311, 312 with metering edges 318, 315, respectively, according to its position. The position of metering edge 311 is regulated by the manual control and the position of metering edge 313 is regulated by the electrical control.

The electrical control comprises a solenoid 302 adapted to position a movable armature 304 in response to a current applied to its coil. The current is supplied by the electrical control signal E input to the connector 300. Variations in current to the coil cause the armature 304 to move in contact with a nose 305 on the valve and position it according to the value of the current. The manual control comprises a lever 318 rotatably fixed to a pivot 320. The lever rotates to position the valve 306 by contacting flange 328. A cam 322 determines the extent of rotation of lever 318 and is in turn controlled by movements of rod 324 connected to the power lever 38 through suitable linkage.

Figure 7A:
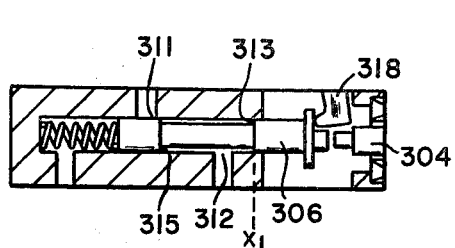
FIGS. 7a–d are partial fragmentary side views in cross section of the positioning of the orifice modulating means illustrated in FIG. 5.
Figure 7B:
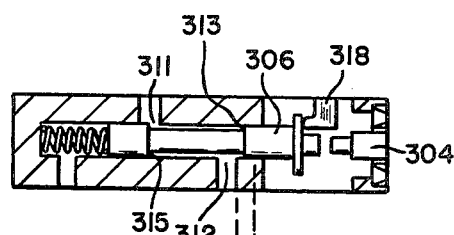
Figure 7C:
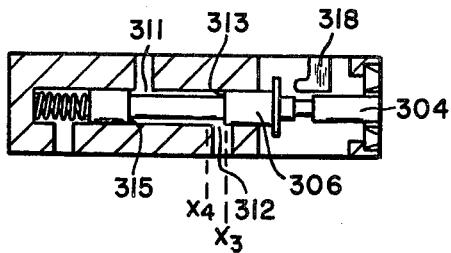
Figure 7D:
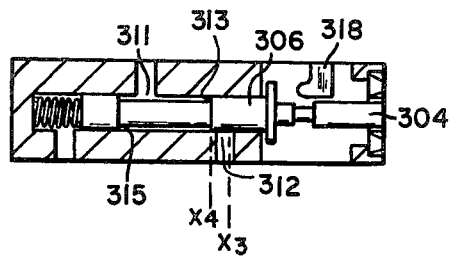

The operation of the second embodiment will now be explained with reference to FIGS. 7a–d and FIG. 4. FIG. 4 illustrates that a schedule of fuel/air ratios, identical with that of the first embodiment is accomplished by the second backup arrangement. Further, as was the case for the first embodiment, the solenoid 304 is capable of travel between positions 0 at the origin and X4 to where it is fully extended. Intermediate of these positions, for example, from position X3 to X4, it positions the metering edge 313 with respect to aperture 316 to schedule fuel along line 224 in FIG. 4. This is the electrical control range of the second embodiment and is shown in FIGS. 7c and 7d. While in this range lever 318 is detached from the valve and the governor controls the position of spool valve 306 by means of the current applied to the coil of solenoid 302.

If, for some reason, a failure of the electrical control occurs, then current will be interrupted to the solenoid 302 and it will return to its initial position at the origin. As the spool valve 306 attempts to follow the armature back to the origin it will be intercepted by the lever 318 as is apparent in FIGS. 7a, 7b. The manual control, regulating the position of lever 318, can then move the spool valve 306 between positions X1, X2, which define the manual control range. Movements of the spool valve in this range control the metering edge 316 with respect to aperture 311 to schedule fuel/air ratios according to line 225 in FIG. 4.

In both backup arrangements the placing of the manual control range intermediate the origin and the electrical control range permits the solenoid to control the fuel/air ratio in a facile manner but still provide for a reliable backup mode if current is interrupted. The method of failure to the manual control schedule is additionally facilitated by the connection of the manual control means to the power lever. With this configuration the desired fuel/air ratio for operation of the engine is not only transduced into the electrical signal PLA but simultaneously into a mechanical position of cams 201, 322. Therefore, when the system experiences an electrical failure, the system not only automatically fails to the manual control range, but also to the fuel/air ratio setting of the power lever. This automatic transfer can be accomplished in the time it takes to move the modulating means to the manual schedule. Normally, the transfer will take place within a few millisecs after electrical failure and the engine will experience only a slight reduction or increase in fuel/air ratio.

While a detailed description of the preferred embodiments and implementations of the invention have been disclosed, it will be obvious to those skilled in the art that various modifications and changes will be made thereto without departing from the spirit and scope of the invention as is hereinafter defined in the appended claims.

I claim:

1. In a fuel control system for a gas turbine engine having an electronic governor which generates an electrical signal indicative of a desired fuel/air ratio of the engine, a fuel control apparatus comprising:
   a metering valve having a position proportional to the fuel flow therethrough, said metering valve being positioned in response to a hydraulic control pressure;
   means for generating said hydraulic control pressure proportional to the pneumatic discharge pressure of the compressor of the engine; and
   means for modulating said control pressure in response to said electrical signal by regulating the area of a control orifice communicating with said control pressure.

2. A fuel control apparatus as defined in claim 1, which further includes:
   means for sensing the position of the metering valve and for generating an actual fuel flow signal indicative of the actual fuel flow therethrough;
   means for differencing said actual fuel flow signal and said electrical signal from said electronic governor and generating an error signal indicative of the difference; and
   said control pressure modulating means modulating said control pressure in response to said error signal.

3. A fuel control apparatus as defined in claim 1, which further includes:
   a pressure regulator maintaining a substantially constant pressure drop across said metering valve.

4. A fuel control apparatus as defined in claim 3, wherein:
   said metering valve includes a spool valve having a metering edge controlling the area of a metering orifice located between an upstream supply of pressurized fuel and a downstream outlet to the engine.

5. A fuel control apparatus as defined in claim 4, wherein:
   said spool valve has said hydraulic control pressure applied to one end via a control chamber which tends to move said spool valve in a direction to open said metering orifice, and has a hydraulic reference pressure applied to its other end via a reference chamber which tends to move said spool valve in a direction to close said metering orifice.

6. A fuel control apparatus as defined in claim 5, wherein:
   said spool valve is further biased to an initial position by opposing forces of resilient means which tend to return said spool valve to said initial position, whereby the position of said spool valve is a function of the difference between the control pressure and said reference pressure.

7. A fuel control apparatus as defined in claim 6, wherein:
   said control pressure modulating means includes a solenoid with a movable armature attached to a valve, the valve cooperating with a control orifice communicating with said control pressure to vary the orifice area by movement wherein the electrical control signal positions the armature to vary the opening of the orifice by moving the valve.

8. A fuel control apparatus as defined in claim 7, wherein:
   said solenoid has a linear travel with respect to the current applied by said electrical signal.

9. A fuel control apparatus as defined in claim 8, wherein:
   said control pressure generating means is a copying valve receiving the pneumatic compressor discharge pressure and copying it into said control pressure by means of the movement of a controlled valve in relation to an orifice.

10. A fuel control apparatus as defined in claim 9, wherein:
    said copying valve includes a first bellows housed by a casing and defining an inner chamber and an outer chamber, one of said chambers being communicated to the compressor pressure and the other being communicated to a source of hydraulic pressure through said controlled valve, said bellows being positioned by changes in the compressor discharge pressure to equalize the pressures in said inner and outer chambers whereby the pressure in said other chamber is a hydraulic copy of the pneumatic pressure in said one chamber.

11. A fuel control apparatus as defined in claim 10, wherein:
    said copying valve includes a second orifice cooperating with said controlled valve and communicating between said hydraulic source and said metering valve to generate said hydraulic control pressure proportional to said compressor discharge pressure.

12. A fuel control apparatus as defined in claim 11, wherein:
    said copying valve includes a second bellows housed by a casing and defining a second inner chamber and a second outer chamber, wheren one of said chambers being sealed to a vacuum and the other of said chambers is communicated to said reference pressure.

13. A fuel control apparatus as defined in claim 12, wherein:
    said second bellows connected to said controlled valve such that it applies a force in opposition to the force applied by said compressor discharge pressure so that the hydraulic control pressure is generated proportional to the difference between the compressor discharge pressure and said reference pressure.

14. A fuel control apparatus as defined in claim 13, wherein:
    a restriction of predetermined area is disposed between said hydraulic control pressure and said metering valve such that the position of the metering valve is controlled as a function of said hydraulic control pressure and the ratio of the areas of said restriction and said control orifice.

* * * * *